US011209830B2

(12) United States Patent
Rakshit et al.

(10) Patent No.: US 11,209,830 B2
(45) Date of Patent: Dec. 28, 2021

(54) SAFETY AWARE AUTOMATED GOVERNANCE OF VEHICLES

(71) Applicant: International Business Machines Corporation, Armonk, NY (US)

(72) Inventors: Sarbajit K. Rakshit, Kolkata (IN); James E. Bostick, Cedar Park, TX (US); John M. Ganci, Jr., Raleigh, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 16/291,217

(22) Filed: Mar. 4, 2019

(65) Prior Publication Data

US 2020/0285246 A1 Sep. 10, 2020

(51) Int. Cl.
*G05D 1/02* (2020.01)
*G06K 9/00* (2006.01)
*G01C 21/30* (2006.01)
*G06F 16/29* (2019.01)
*G07C 5/00* (2006.01)

(52) U.S. Cl.
CPC .......... *G05D 1/0246* (2013.01); *G01C 21/30* (2013.01); *G05D 1/0285* (2013.01); *G06F 16/29* (2019.01); *G06K 9/00798* (2013.01); *G06K 9/00805* (2013.01); *G07C 5/008* (2013.01); *G05D 2201/0213* (2013.01)

(58) Field of Classification Search
CPC .............. G05D 1/0246; G05D 1/0285; G05D 2201/0213; G06F 16/29; G01C 21/30; G06K 9/00798; G06K 9/00805; G07C 5/008
See application file for complete search history.

(56) References Cited

U.S. PATENT DOCUMENTS

| 7,979,172 | B2 | 7/2011 | Breed |
| 8,311,734 | B2 | 11/2012 | Georgis et al. |
| 9,481,367 | B1 | 11/2016 | Gordon et al. |
| 9,483,948 | B1 | 11/2016 | Gordon et al. |
| 2008/0027599 | A1 | 1/2008 | Logan et al. |
| 2010/0201509 | A1* | 8/2010 | Hara ...................... G08G 1/166 340/435 |

(Continued)

OTHER PUBLICATIONS

Anonymous, "Cognitive Animal Recognition and Collision Avoidance for Autonomous Vehicle," An IP.com Prior Art Database Technical Disclosure, IPCOM000249593D, Published Mar. 7, 2017, 2 pages.

(Continued)

*Primary Examiner* — Anne Marie Antonucci
*Assistant Examiner* — Sahar Motazedi
(74) *Attorney, Agent, or Firm* — Yee & Associates, P.C.

(57) ABSTRACT

Detecting potential safety issues is provided. An image is received from an imaging device located on a vehicle. The image is analyzed to identify an object. The object identified in the image is compared with images of objects stored in a database to determine a potential safety issue associated with the object. A set of protective roadway barriers is identified in an area of the vehicle and the object. An adjustment to operation of the vehicle is calculated based on the potential safety issue and the set of protective roadway barriers. The operation of the vehicle is adjusted based on the calculated adjustment.

20 Claims, 6 Drawing Sheets

(56) References Cited

U.S. PATENT DOCUMENTS

| | | |
|---|---|---|
| 2012/0025964 A1* | 2/2012 | Beggs ............... B60Q 1/26 340/435 |
| 2014/0136414 A1 | 5/2014 | Abhyanker |
| 2015/0104071 A1* | 4/2015 | Martin ............ G08G 1/0129 382/104 |
| 2016/0132705 A1 | 5/2016 | Kovarik et al. |
| 2017/0234689 A1 | 8/2017 | Gibson et al. |
| 2018/0061237 A1 | 3/2018 | Erickson et al. |
| 2020/0074862 A1* | 3/2020 | Johnston ............ G05D 1/0088 |

OTHER PUBLICATIONS

Wired Brand Lab, "Autonomous vehicles—Watson IoT helps pave an industry revolution," IBM Internet of Things Blog, Nov. 1, 2017, accessed Mar. 4, 2019, 8 pages. https://www.ibm.com/blogs/internet-of-things/iot-autonomous-vehicles/.

IBM Internet of Things, Automotive Archives, accessed Mar. 4, 2019, 4 pages. https://www.ibm.com/blogs/internet-of-things/tag/automotive/.

University of Michigan, "How even one automated, connected vehicle can improve safety and save energy in traffic," ScienceDaily, Science News, May 9, 2018, accessed Mar. 4, 2019, 4 pages. https://www.sciencedaily.com/releases/2018/05/180509104925.htm.

AD Aware Traffic Control, "Autonomous Driving Aware Traffic Control—Final Report," Jul. 2017, accessed Mar. 4, 2019, 60 pages. https://www.drivesweden.net/sites/default/files/content/ad_aware_traffic_control_-_final_report_v11_0.pdf.

* cited by examiner

SAFETY AWARE AUTOMATED GOVERNANCE OF VEHICLES

BACKGROUND

For the past many years, innovations within the automotive industry have created safer vehicles. For example, advanced driver-assistance systems have been developed to automate, adapt, and enhance vehicle systems for safety and reduction of driver errors. These safety systems are designed to avoid collisions by alerting a driver to potential problems or to avoid collisions by automatically braking the vehicle. Adaptive features may include, for example, automated headlight illumination, automated windshield wiper action, adaptive cruise control, vehicular avoidance systems, pedestrian avoidance systems, traffic warnings, lane departure warnings, automatic lane centering, and object detection in blind spots.

Additionally, some advanced vehicles can detect surroundings using a variety of technologies, such as, for example, radar, light detection and ranging (LIDAR), global positioning system (GPS) technology, odometry, and computer vision. Advanced control systems interpret the sensory information provided by these various technologies to identify appropriate navigation paths, as well as, obstacles and relevant signage. These advanced control systems can be used to distinguish between different vehicles on a roadway and determine a path to a desired destination.

SUMMARY

According to one illustrative embodiment, a computer-implemented method for detecting potential safety issues is provided. An image is received from an imaging device located on a vehicle. The image is analyzed to identify an object. The object identified in the image is compared with images of objects stored in a database to determine a potential safety issue associated with the object. A set of protective roadway barriers is identified in an area of the vehicle and the object. An adjustment to operation of the vehicle is calculated based on the potential safety issue and the set of protective roadway barriers. The operation of the vehicle is adjusted based on the calculated adjustment. According to other illustrative embodiments, a computer system and computer program product for detecting potential safety issues are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
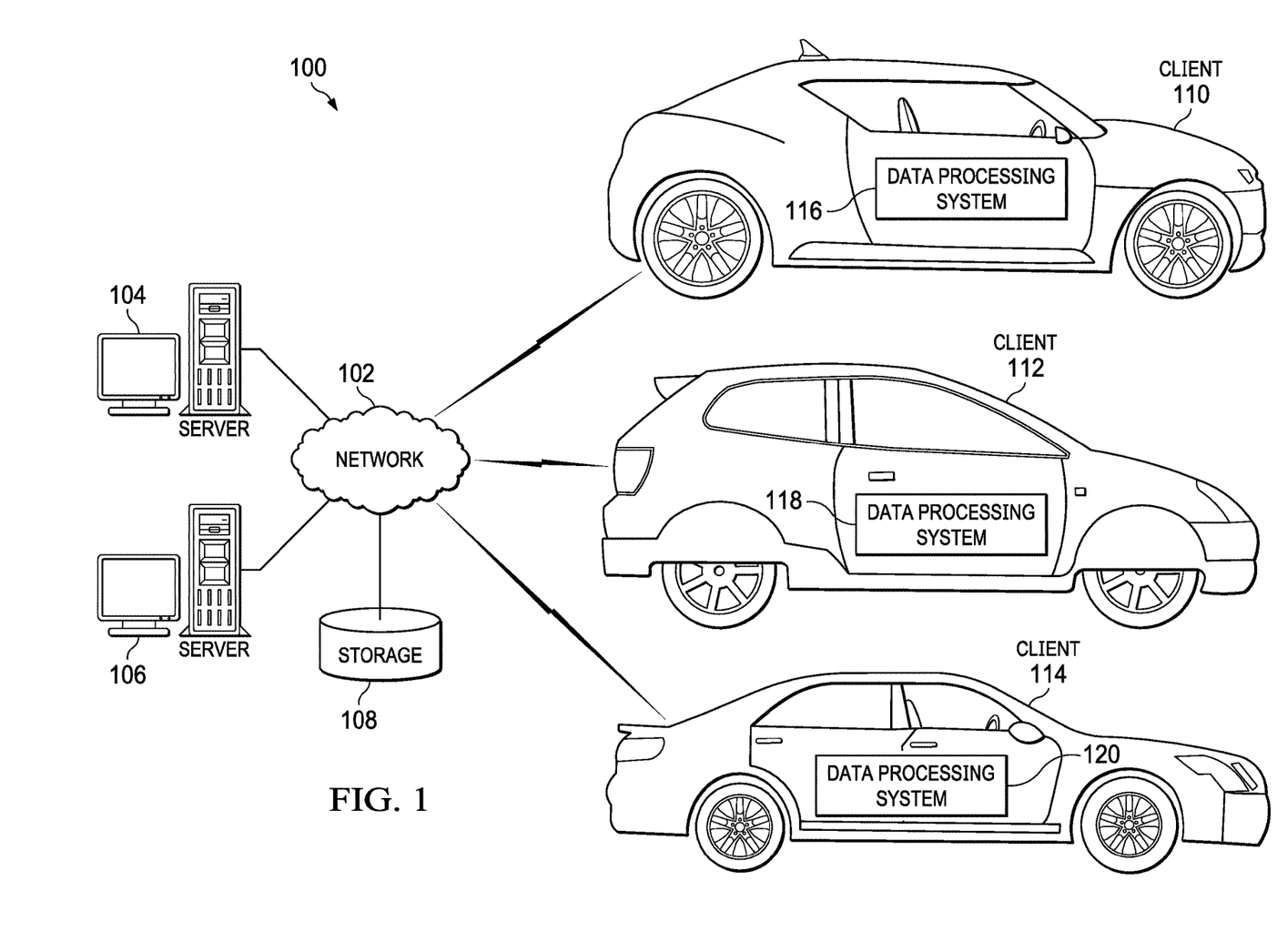
FIG. 1 is a pictorial representation of a network of data processing systems in which illustrative embodiments may be implemented.
Figure 2:
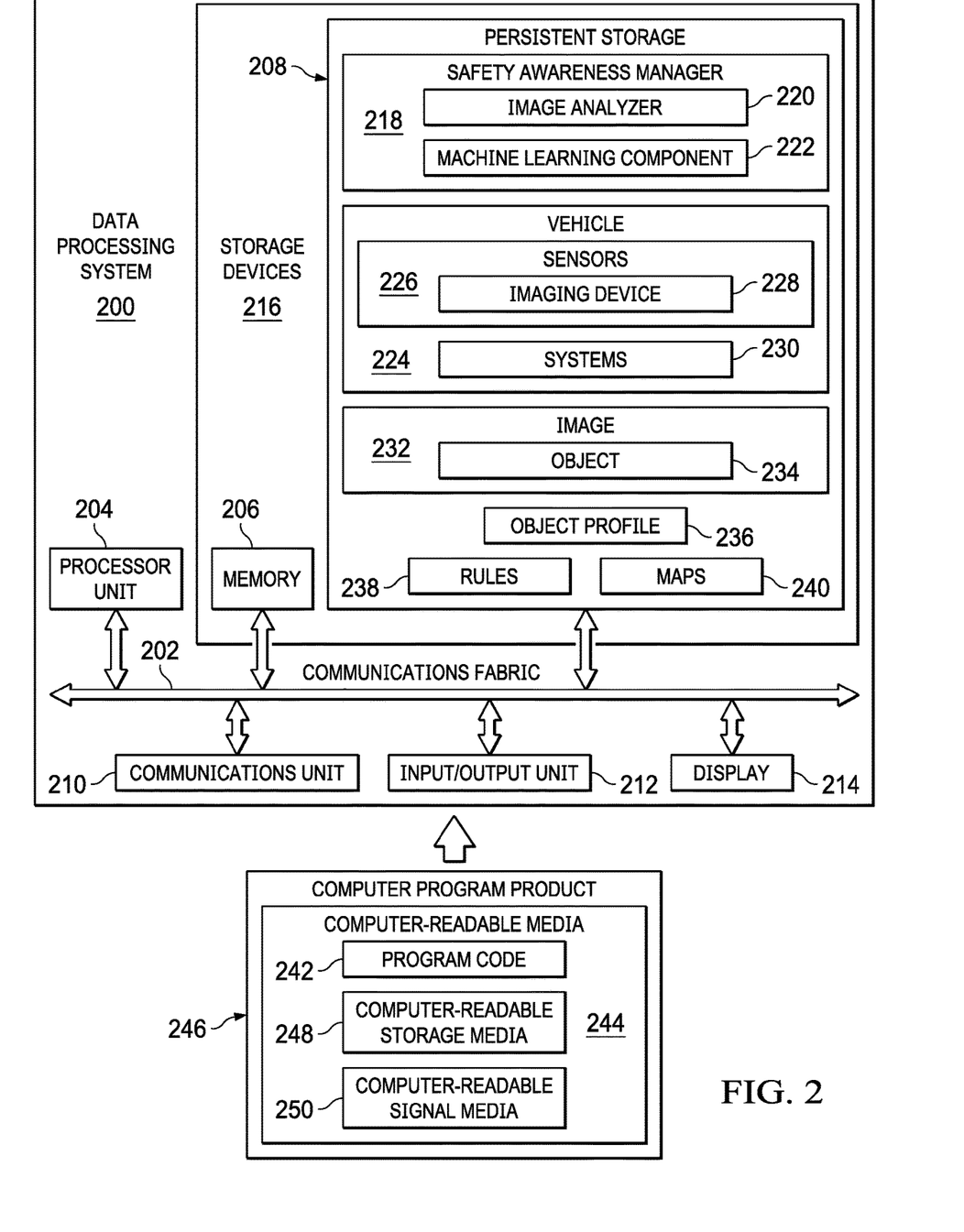
FIG. 2 is a diagram of a data processing system in which illustrative embodiments may be implemented.
Figure 3:
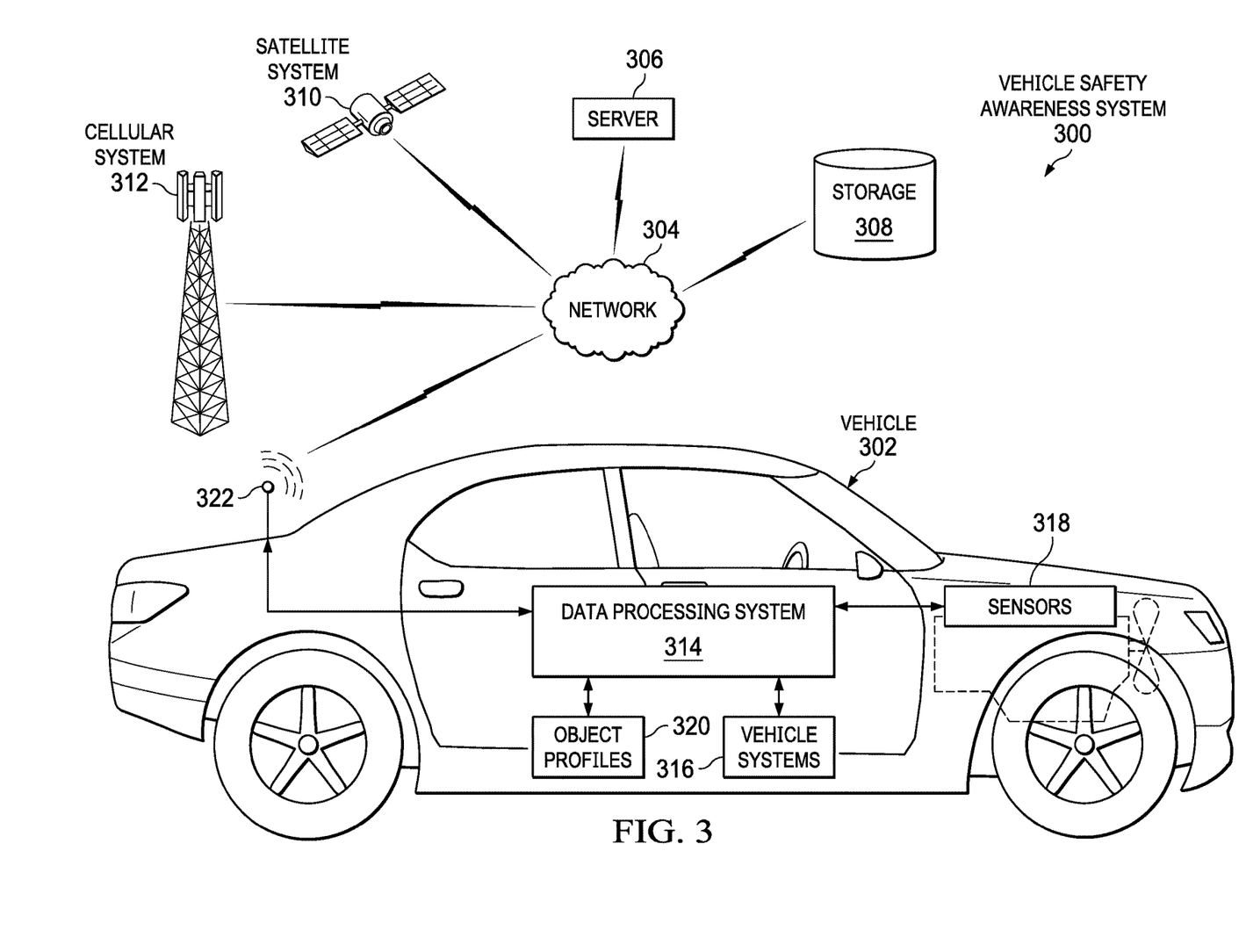
FIG. 3 is a diagram illustrating an example of a vehicle safety awareness system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide one or more services, such as, for example, potential safety issue detection services, event monitoring services, data services, map services, navigation services, communication services, and the like, to registered vehicle clients. Server 104 and server 106 may also provide other information, such as, for example, operating system images, software applications and programs, software updates, software patches, and the like, to these registered vehicle clients. Also, it should be noted that server 104 and server 106 may represent clusters of servers in a data center. Alternatively, server 104 and server 106 may represent computing nodes in a cloud environment.

Client 110, client 112, and client 114 also connect to network 102. Clients 110, 112, and 114 are vehicles that include onboard data processing systems, such as data processing system 116, data processing system 118, and data processing system 120, respectively. Clients 110, 112, and 114 may represent any type of vehicle, such as, for example, a car, van, sport utility vehicle, truck, semi-tractor trailer, taxi, bus, train, and the like.

Storage 108 is a network storage device capable of storing any type of data in a structured format or an unstructured format. Storage 108 may also represent a plurality of network storage devices connected to network 102. Storage 108 may store information, such as, for example, lists of registered vehicle clients with identifiers and specification information, images of a plurality of different objects, such as animals, which may pose a potential safety issue to vehicles, profiles associated with the plurality of different object images that identify a corresponding object and define behavior and characteristics of that particular object, associated vehicle operation control rules, and the like. Further, storage 108 may store other types of data, such as authentication or credential data that may include user names, passwords, and biometric templates associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, a telecommunications network, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as data processing system 116 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, or some combination of the above. The media used by persistent storage 208 may be removable. For example, a removable hard drive may be used for persistent storage 208.

In this example, persistent storage 208 stores safety awareness manager 218. However, it should be noted that even though safety awareness manager 218 is illustrated as residing in persistent storage 208, in an alternative illustrative embodiment safety awareness manager 218 may be a separate component of data processing system 200. For example, safety awareness manager 218 may be a hardware component coupled to communication fabric 202 or a combination of hardware and software components. In another alternative illustrative embodiment, a first set of components of safety awareness manager 218 may be located in data processing system 200 and a second set of components of safety awareness manager 218 may be located in a second data processing system, such as, for example, server 104 in FIG. 1. In yet another alternative illustrative embodiment, safety awareness manager 218 may be located in the server instead of, or in addition to, data processing system 200.

Safety awareness manager 218 controls the process of detecting potential safety issues posed by objects, such as humans and animals, to one or more vehicles traveling on a roadway and automatically adjusting operation of the vehicles in response to detecting a potential safety issue. In this example, safety awareness manager 218 includes image analyzer 220 and machine learning component 222. Safety awareness manager 218 utilizes image analyzer 220 to perform object recognition within images captured by image capturing devices of the vehicles. Machine learning component 222 may be, for example, an artificial intelligence program. Safety awareness manager 218 utilizes machine learning component 222 to analyze, classify, and learn collected data regarding potential safety issues to the vehicle posed by detected objects within the images.

Vehicle 224 represents an identifier and corresponding specification information regarding a particular vehicle that is being monitored by data processing system 200. However, it should be noted that vehicle 224 may represent a plurality of different vehicle identifiers. Sensors 226 represent a set of one or more sensor devices corresponding to vehicle 224. In this example, sensors 226 include imaging device 228. Imaging device 228 may be, for example, a camera, such as a video camera, still picture camera, infrared camera, or any combination thereof. Imaging device 228 captures images of the roadway and an area around vehicle 224. Imaging device 228 sends the captured images to image analyzer 220 for analysis and object recognition. Sensors 226 may also include other types of sensors, such as sound capturing devices (e.g., microphones or the like), to assist in detecting potential safety issues.

Systems 230 represent subsystems of vehicle 224 that safety awareness manager 218 receives data and information from regarding, for example, current status and settings of systems 230. Systems 230 may include, for example, a speed regulation system (e.g., cruise control system), navigation system, GPS system, braking system, steering system, communication system, and the like. In addition, safety awareness manager 218 may automatically control one or more of systems 230 in response to a detected potential safety issue to vehicle 224. For example, safety awareness manager 218 may automatically slow vehicle 224 and/or steer vehicle 224 to a different lane of traffic after detecting an object approaching the roadway on a collision course with vehicle 224. Alternatively, in other illustrative embodiments, such as those involving a human operator of vehicle 224, safety awareness manager 218 may output an alert and/or a recommended action to the human operator of vehicle 224. For example, in some illustrative embodiments, safety awareness manager 218 outputs an alert to the human operator while also automatically adjusting operation of vehicle 224. In other such illustrative embodiments, safety awareness manager 218 may output an alert which includes a recommended course of action and wait until receiving user input approving the recommended action before adjusting operation of vehicle 224. Further, safety awareness manager 218 may automatically communicate an alert to other vehicles within a defined distance regarding the detected potential safety issue.

Image 232 represents one of a plurality of different images captured by imaging device 228. Image 232 is a picture of the roadway that vehicle 224 is traveling on and includes the area along the roadway. In this example, image 232 includes object 234. Object 234 is, for example, an object, such as a deer or other animal, that image analyzer 220 detected within image 232. Object profile 236 represents a profile that corresponds to object 234. Object profile 236 may, for example, define the behavior and characteristics of object 234. For example, if object 234 is identified as a deer, then corresponding object profile 236 may define that the deer has a tendency to unexpectedly jump onto the roadway and that risk is high. It should be noted that object profile 236 may represent a plurality of different profiles corresponding to a plurality of different types of objects.

Rules 238 represent a set of one or more rules associated with object 234. However, it should be noted that rules 238 may represent a plurality of different rule sets corresponding to a plurality of different types of objects. Safety awareness manager 218 utilizes rules 238 to automatically adjust operation of vehicle 224 when safety awareness manager 218 detects a potential safety issue to vehicle 224 by object 234 based on analysis of image 232. Rules 238 may include, for example, decrease vehicle speed by "X" amount when object 234 is within "Y" distance of the roadway.

Maps 240 represent one or more area maps that correspond to the geographic location of vehicle 224 where object 234 was detected. Maps 240 include roadways and any possible protective roadway barriers along the roadways. Protective roadway barriers may include, for example, walls, fences, concrete barriers, and the like, which prevent object 234 from unexpectedly entering the roadway in front of vehicle 224. Safety awareness manager 218 utilizes maps 240 to determine whether a protective roadway barrier exists between vehicle 224 and object 234. If safety awareness manager 218 determines that a protective roadway barrier does exist between vehicle 224 and object 234 based on information contained in maps 240, then safety awareness manager 218 may not adjust operation of vehicle 224. Also, it should be noted that safety awareness manager 218 may determine that a protective roadway barrier exists between vehicle 224 and object 234 based on analysis of image 232 in addition to, or instead of, maps 240.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the illustrative embodiments described herein, vehicles utilize image analysis and object detection to identify safety issues and movement patterns of humans and animals near roadways. Illustrative embodiments take advantage of these capabilities to detect potential safety issues of humans, and especially animals, near a roadway that have a high probability of moving into the roadway and on a collision course with a vehicle. Illustrative embodiments automatically adjust operation of these vehicles to varying degrees based on the level of probability and danger. Levels of probability may be, for example, low probability, medium probability, and high probability. Low probability may be, for example, up to a first defined threshold level of probability, such as 25%; medium probability may be greater than the first defined threshold up to a second defined threshold level of probability, such as 75%; and high probability may be greater than the second defined threshold level of probability up to 100%. In addition, illustrative embodiments may communicate with other vehicles equipped with illustrative embodiments, as well as with other vehicles and people in the surrounding area of the vehicle, if possible, regarding identified potential safety issues.

Illustrative embodiments take into consideration animals in a wooded area and identify any protective roadway barriers, such as walls or fencing, that may prevent these animals from reaching the roadway from where the animals were detected. Illustrative embodiments also consider roadways with bike lanes or close sidewalks with no protective roadway barriers in place. Illustrative embodiments further consider objects, such as rocks, trees, tree limbs, and the like, detected falling toward the roadway.

As an example scenario, illustrative embodiments detect three deer twelve feet from the roadway. However, illustrative embodiments also detect that a six-foot brick wall exists three feet off the roadway. In this example scenario, illustrative embodiments do not adjust operation of the vehicle.

As another example, illustrative embodiments again identify three deer twelve feet from the roadway. However, this time illustrative embodiments do not detect any type of protective roadway barrier between the vehicle and the deer. In this example scenario, illustrative embodiments adjust operation of the vehicle by reducing speed for faster stopping, if necessary. Further, if additional corrective actions are available to the vehicle, then illustrative embodiments will utilize those corrective actions, as well. For example, if multiple lanes exist for the same direction of traffic, then illustrative embodiments may instruct the vehicle to move to a lane furthest away from the potential safety issue. Furthermore, illustrative embodiments may transmit an alert to other vehicles in the surrounding area about the potential safety issue and similarly instruct the other vehicles to slow down and change lanes, if possible.

Thus, illustrative embodiments teach vehicles (such as, but not limited to, autonomous vehicles) on the roadway to understand potential safety issues, such as animals running across the roadway, via what the vehicle identifies using its on-board imaging system (e.g., cameras), statistical analysis of what is identified (i.e., what type of object is identified and how far away is the object from the vehicle), and probability of danger. Based on the potential safety issues, illustrative embodiments govern vehicles systematically and automatically to slow to a situationally safe speed based on what is identified or understood by the vehicles. Moreover, illustrative embodiments may identify one or more protective roadway barriers, such as walls, fences, concrete barriers, dense shrubbery, and the like, between a detected object posing a potential safety issue and the roadway to mitigate or possibly eliminate the potential safety issue. Illustrative embodiments communicate with other nearby vehicles so that all vehicles in the surrounding area of the potential safety issue are provided with the same information. Further, illustrative embodiments utilize a feedback loop that allows vehicles to teach a central server over time regarding real world statistics. For example, vehicles automatically shined bright lights on deer 2,500 times during the current year, but still there were seventeen incidents of deer running into the roadway.

Illustrative embodiments differ from known solutions in that illustrative embodiments look for potential safety issues and adjust vehicle operation based on detection of these issues or communications of similar issues received from other vehicles. Illustrative embodiments further differentiate from known solutions by understanding whether an object, such as an animal or human, would be able to freely enter the roadway or if the object is blocked from entering the roadway in that location by a protective roadway barrier, such as, for example, a fence or wall. Hence, illustrative embodiments detect potential real-time safety issues, govern control of the vehicle that detected the potential safety issue, and communicate the same to other vehicles in the surrounding area.

Illustrative embodiments utilize GPS and mapping to identify the exact geolocation of the vehicle when a potential safety issue is detected. Illustrative embodiments map the location to roadway maps to determine whether a fence or wall may exist to block the potential safety issue from entering the roadway. Illustrative embodiments also utilize the location information to determine other vehicles within a defined radius of the GPS location so that illustrative embodiments can govern other vehicles (such as autonomous vehicles) within the defined radius or communicate the potential safety issue to human driven vehicles within the defined radius.

Illustrative embodiments also utilize cameras and image analysis. Illustrative embodiments use image analysis on video taken by a vehicle to detect animate objects, such as animals and humans, in or near the roadway. Illustrative embodiments may also detect inanimate objects, such as balls, strollers, scooters, bikes, and the like, approaching the roadway. In addition, illustrative embodiments may utilize other types of sensors, such as sound detecting sensors, to detect potential safety issues.

Further, illustrative embodiments utilize a knowledgebase or database containing images of known objects and object profiles. The knowledgebase is set up in advance and increases in size over time. The following is an example of information that may be stored in the knowledgebase. An image of a deer is stored in the knowledgebase. When the camera captures an image of an object, illustrative embodiments compare the captured image to images in the knowledgebase to determine whether the object in the captured image is a deer. Illustrative embodiments pull up associated columns in the knowledgebase (i.e., object profile associated with the identified object) which indicate that a deer can dart onto a roadway at 35 MPH and that deer have a tendency to dart onto roadways. Thus, illustrative embodiments identify deer as a high-level risk for creating potential safety issues for vehicles. Consequently, in some illustrative embodiments the speed of vehicles in the area to increase safety is automatically reduced. Illustrative embodiments may perform other automatic actions based on other data in the knowledgebase. For example, the object profile may indicate that shining bright lights in the faces of deer cause the deer to freeze. As a result, illustrative embodiments may instruct the vehicle to turn on the high beam headlights.

Illustrative embodiments may also employ varying degrees of vehicle operation control. For example, if a deer within a certain radius, such as 1 to 5 unimpeded yards away from the roadway, then illustrative embodiments may utilize an associated rule to slow the vehicle by 20 percent. However, if that same deer is 6 to 15 unimpeded yards away from the roadway, then illustrative embodiments may utilize an associated rule to slow the vehicle by 10 percent.

Further, illustrative embodiments may employ a feedback loop. For example, illustrative embodiments may modify automated operational control of vehicles to known dangers over time. For example, illustrative embodiments may learn over time that shining high beam headlights in a deer's face no longer works, but instead rattles them. For example, illustrative embodiments may shine bright lights at a deer near a roadway, but observe that the deer darted into the roadway anyway. Furthermore, illustrative embodiments may identify a new object in an image and record in a corresponding profile the speed of the object and whether the object entered the roadway or not. As this type of information is collected and recorded, illustrative embodiments learn and become smarter over time.

As another example, illustrative embodiments compare a captured image to images in the knowledgebase and detect that a sloth is eight feet off the roadway. The object profile associated with the sloth image indicates how slow a sloth is. Consequently, the level of risk corresponding to the detected sloth is low. As a result, illustrative embodiments may not adjust operation of the vehicle that captured the image of the sloth. However, illustrative embodiments may still communicate to other vehicles in the area to be on the lookout for the sloth.

As a further example, illustrative embodiments may compare a captured image to images in the knowledgebase and detect that a ball is rolling towards the street. The object profile associated with the rolling ball may indicate that a rolling ball is often followed by children running after it. For example, consider children playing basketball in a driveway that is sloped downward towards the roadway. The fact that children are playing nearby the roadway, combined with a high probability that the basketball may roll downhill toward the roadway, alerts illustrative embodiments to the potential safety issue. Consequently, illustrative embodiments determine that the risk level is high and adjust operation of the vehicle that captured the image of the rolling ball by slowing the vehicle to 10 MPH, for example.

The cameras on the vehicle are set up to constantly scan the roadway area in real time. The knowledgebase stores a plurality of different images of objects so that image analysis knows what is being looked at. This knowledgebase may include profiles corresponding to each of the different objects that may define object behavior and associated risk. Vehicles are set up to take instruction from illustrative embodiments and slow down and change lanes when instructed to do so by illustrative embodiments. In addition, vehicles are set up to communicate with nearby vehicles or to communicate to a central server, which then sends communications to all vehicles within a configured radius of the GPS location of the vehicle detecting the potential safety issue.

Thus, illustrative embodiments provide one or more technical solutions to overcome a technical problem with detection of potential safety issues for vehicles. As a result, the one or more technical solutions provide a technical effect in the field of vehicles by increasing safety performance of vehicles.

With reference now to FIG. 3, a diagram illustrating an example of a vehicle safety awareness system is depicted in accordance with an illustrative embodiment. Vehicle safety awareness system 300 can be implemented in an autonomous vehicle, in some embodiments. However, it is to be understood that vehicle safety awareness system 300 is not limited to autonomous vehicles. Vehicle safety awareness system 300 may be implemented in a network of data processing systems, such as network data processing system 100 in FIG. 1. Vehicle safety awareness system 300 is a system of hardware and software components for detecting potential safety issues for a vehicle based on analyzing images captured by cameras of the vehicle and automatically performing actions to mitigate or eliminate the detected safety issues by controlling different systems of the vehicle.

In this example, vehicle safety awareness system 300 includes vehicle 302, network 304, server 306, storage 308, satellite system 310, and cellular system 312. However, it should be noted that vehicle safety awareness system 300 is intended as an example only and not as a limitation of illustrative embodiments. In other words, vehicle safety awareness system 300 may include more or fewer components than shown and may include any number of the same component.

Vehicle 302 may be, for example, client 110 in FIG. 1. It should be noted that vehicle 302 may represent any type of vehicle, such as an automobile, a truck, a van, a semi-tractor trailer, a bus, and the like. In this example, vehicle 302 includes data processing system 314, vehicle systems 316, sensors 318, object profiles 320, and antenna 322. However, it should be noted that vehicle 302 may include other systems, devices, and data not shown.

Data processing system 314 may be, for example, data processing system 116 in FIG. 1 or data processing system 200 in FIG. 2. Data processing system 314 provides the data processing capabilities of vehicle 302. Data processing system 314 is communicatively coupled to vehicle systems 316, sensors 318, object profiles 320, and antenna 322.

Vehicle systems 316 represent subsystems of vehicle 302. Vehicle systems 316 include, for example, a speed control system, a navigation system, a GPS system, a braking system, a steering system, a communication system, and the like. Data processing system 314 collects data and information from vehicle systems 316. For example, the GPS system provides the coordinates for identification of the current geographic location of vehicle 302. In addition, data processing system 314 may automatically control one or more systems of systems 316 in response to detecting a potential safety issue or danger to vehicle 302 based on analysis of data captured by sensors 318.

Sensors 318 represent a set of one or more sensors for monitoring a roadway that vehicle 302 is currently traveling on. Sensors 318 may include, for example, imaging and sound sensors for detecting objects, such as animals and humans, entering the roadway. Object profiles 320 include information corresponding to detected objects, such as, for example, characteristics and behaviors of each detected object.

Vehicle 302 may use antenna 322 to send data to and receive data from server 306, storage 308, satellite system 310, and cellular system 312. Even though antenna 322 is depicted as an external antenna in this example, antenna 322 may be an internal antenna located in, for example, a communication unit, such as communications unit 210 in FIG. 2, within data processing system 314. Further, it should be noted that any form of wireless communication, such as, for example, radio transmission, microwave transmission, cellular telephone transmission, wireless Web transmission, Wi-Fi transmission, Bluetooth transmission, or any combination thereof, may be employed for communication purposes within and between the different components comprising vehicle safety awareness system 300.

Network 304 may be, for example, network 102 in FIG. 1. Network 304 provides communication between vehicle 302, server 306, storage 308, satellite system 310, and cellular system 312. However, it should be noted that network 304 may provide communication with other systems and devices not shown.

Server 306 may provide information and/or services to vehicle 302. Vehicle 302 is a client of server 306. In addition, server 306 may collect and track information received from vehicle 302. Server 306 may be, for example, server 104 in FIG. 1. In addition, server 306 may represent a plurality of server computers connected to network 304.

Storage 308 may be, for example, storage 108 in FIG. 1. Storage 308 may store, for example, identifiers for a plurality of vehicles, object images, object profiles, vehicle operation control rules, maps, and the like. In addition, storage 308 may represent a plurality of different storage devices connected to network 304.

Satellite system 310 may be, for example, a network of GPS satellites. GPS is a satellite-based radio navigation system. GPS is designed so that signals from at least four satellites are available anywhere on earth, which are sufficient to compute the current geographic location of a GPS transceiver located on vehicle 302.

Cellular system 312 may be, for example, a network of regional, national, or global cellular telephone equipment provided by a public or private telecommunications carrier. The cellular telephone equipment may include, for example, a network of cell towers, Evolved Node B towers, and/or satellites. Vehicle 302 may use cellular system 312 for sending and receiving data, as well as for voice and textual communication purposes. In addition, vehicle 302 may utilize cellular system 312 to provide temporary geographic location data when, for example, GPS data signals are not available from satellite system 310.

Figure 4:
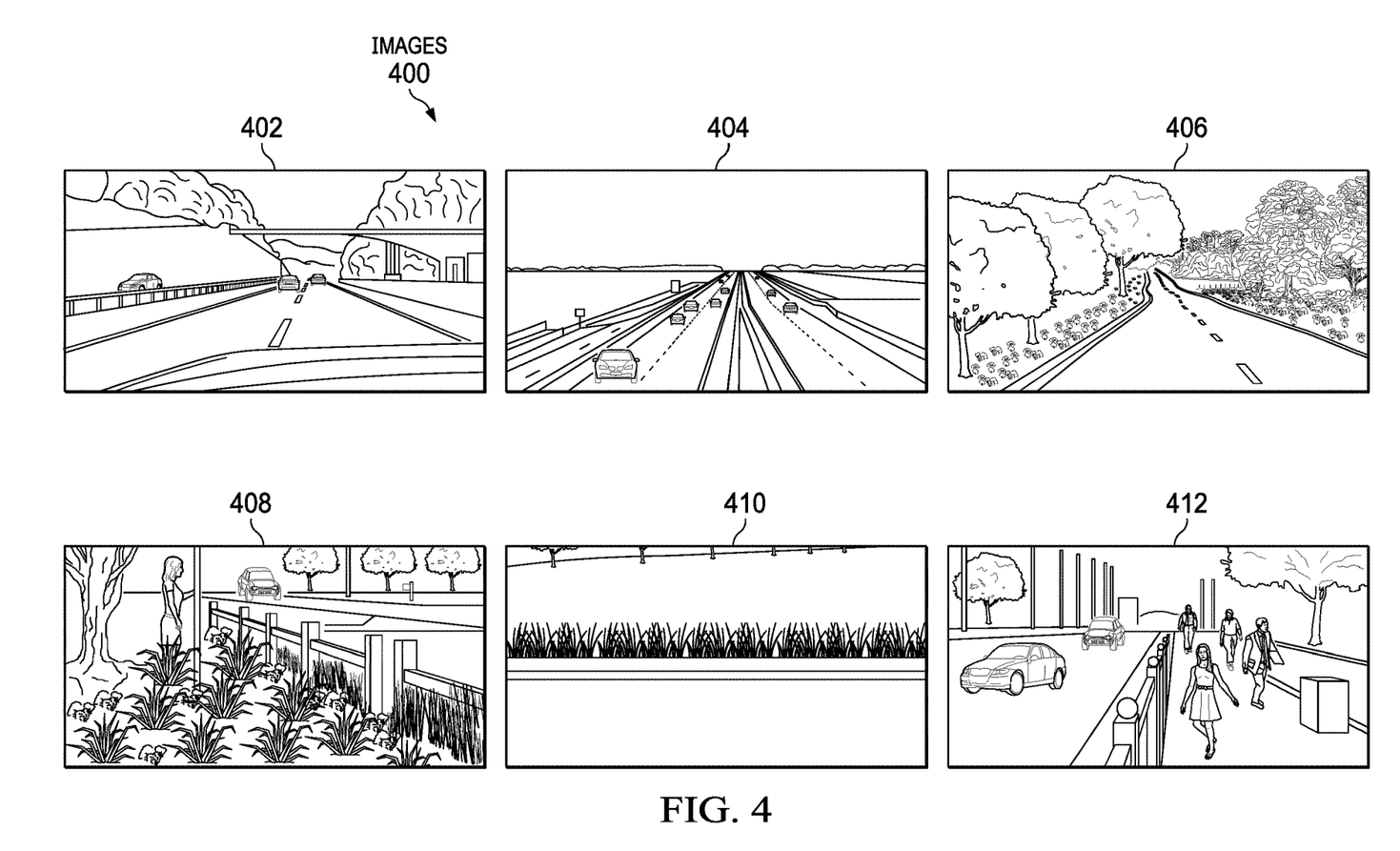
FIG. 4 illustrates examples of images in accordance with an illustrative embodiment.

With reference now to FIG. 4, examples of images are depicted in accordance with an illustrative embodiment. Images 400 show images of roadways with and without protective roadway barriers. Images 400 include image 402, image 404, image 406, image 408, image 410, and image 412.

Image 402 shows a roadway with concrete embankments on both sides, which decrease a probability and risk of an object entering the roadway unexpectedly. Image 404 shows a roadway with water and fencing on one side, making it difficult for an object to enter the roadway from that direction. Image 406 shows a roadway in a forest without any protective roadway barriers allowing an object, such as a deer, to freely enter the roadway from the trees, which increases risk and potential of safety issues.

Image 408 shows fencing along a roadway, which increases the time required for an object to enter the roadway from that direction. Image 410 shows a roadside play area without protective roadway barrier where children can come close to the roadway, which increases risk. Image 412 shows a sidewalk beside a roadway with a protective barrier, which decreases risk.

Figure 5:
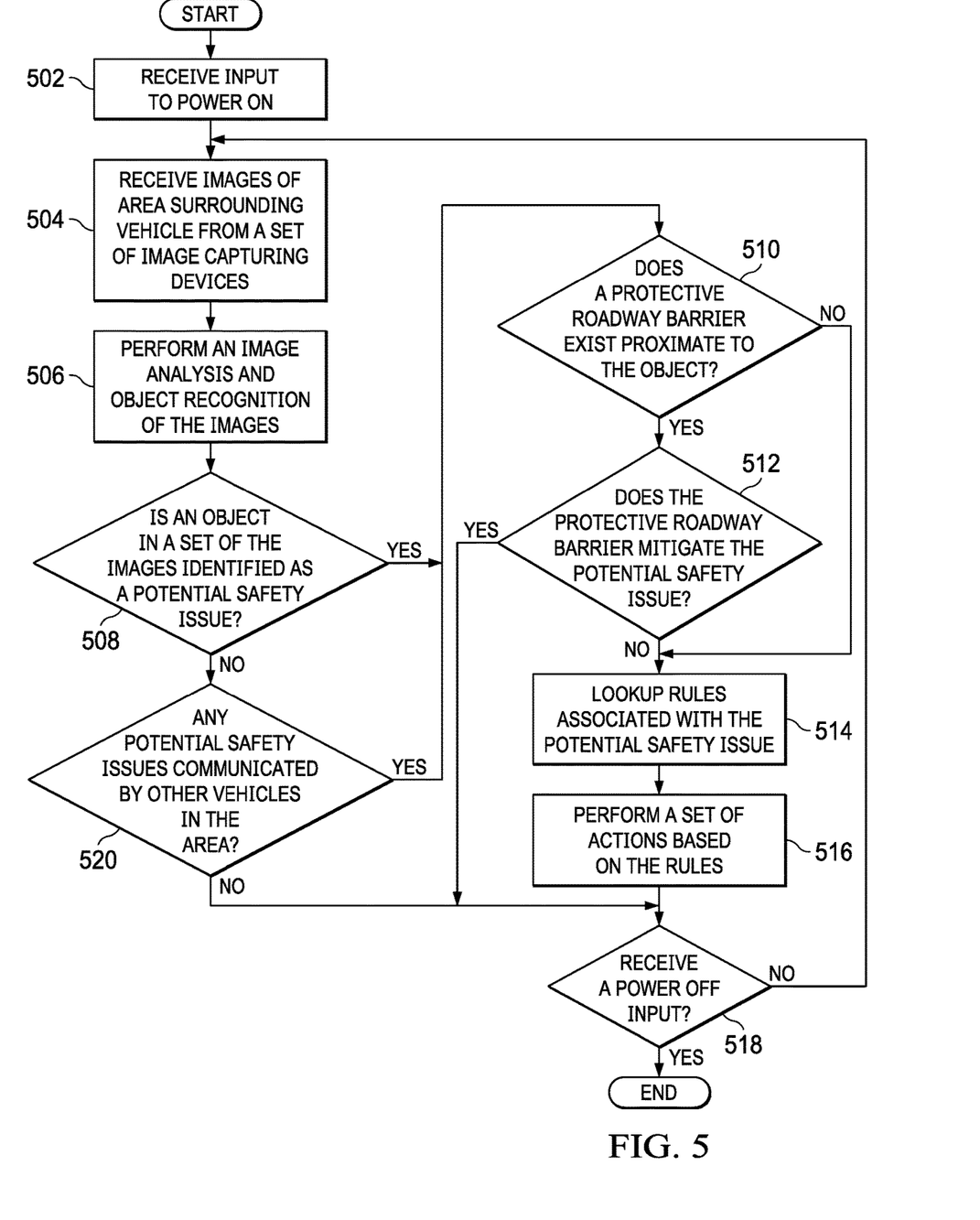
FIG. 5 is a flowchart illustrating a process for context and safety aware automated governance of vehicles in accordance with an illustrative embodiment.

With reference now to FIG. 5, a flowchart illustrating a process for context and safety aware automated governance of vehicles is shown in accordance with an illustrative embodiment. The process shown in FIG. 5 may be implemented in a data processing system, such as, for example, data processing system 116 in FIG. 1; data processing system 200 in FIG. 2; or data processing system 314 in FIG. 3.

The process begins when the data processing system of a vehicle receives an input to power on (step 502). After powering on, the data processing system receives images of an area surrounding the vehicle from a set of one or more image capturing devices, such as cameras (step 504). In addition, the data processing system performs an image analysis and object recognition of the images (step 506).

The data processing system makes a determination as to whether an object detected in a set of one or more images is identified as a potential safety issue (step 508). If the data processing system determines that an object detected in the set of images is identified as a potential safety issue, yes output of step 508, then the data processing system makes a determination as to whether a protective roadway barrier exists proximate to the object (step 510). If the data processing system determines that a protective roadway barrier does not exist proximate to the object, no output of step 510, then the process proceeds to step 514. If the data processing system determines that a protective roadway barrier does exist proximate to the object, yes output of step 510, then the data processing system makes a determination as to whether the protective roadway barrier mitigates the potential safety issue (step 512).

If the data processing system determines that the protective roadway barrier does mitigate the potential safety issue, yes output of step 512, then the process proceeds to step 518. If the data processing system determines that the protective roadway barrier does not mitigate the potential safety issue, no output of step 512, then the data processing system looks up rules associated with the potential safety issue (step 514). Further, the data processing system performs a set of actions to adjust operation of the vehicle, such as decrease a speed of the vehicle, change traffic lane of the vehicle, change traffic route of the vehicle, and the like, based on the rules associated with the potential safety issue (step 516).

Afterward, the data processing system makes a determination as to whether the data processing system received a power off input (step 518). If the data processing system did not receive a power off input, no output of step 518, then the process returns to step 504 where the data processing system continues to receive images. If the data processing system did receive a power off input, yes output of step 518, then the process terminates thereafter.

Returning again to step 508, if the data processing system determines that an object detected in the set of images is not identified as a potential safety issue, no output of step 508, then the data processing system makes a determination as to whether any potential safety issues regarding detected objects are communicated by other vehicles in the area to the vehicle (step 520). If the data processing system determines that one or more potential safety issues regarding detected objects are communicated by other vehicles in the area to the vehicle, yes output of step 520, then the process returns to step 510 where the data processing system determines whether one or more protective roadway barriers exist proximate to the detected objects. If the data processing system determines that no potential safety issues are communicated by other vehicles in the area to the vehicle, no output of step 520, then the process returns to step 518 where the data processing system determines whether a power off input was received.

Figure 6:
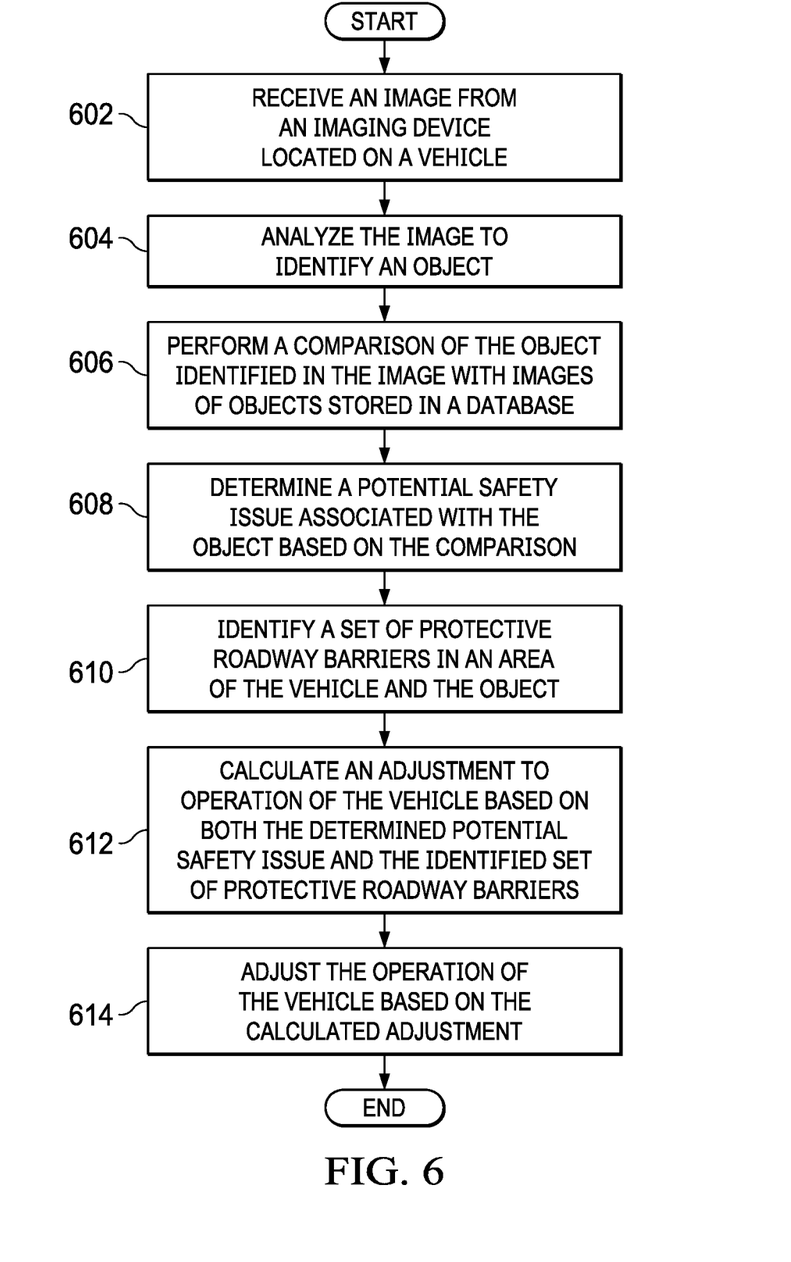
FIG. 6 is a flowchart illustrating a process for adjusting vehicle operation in accordance with an illustrative embodiment.

With reference now to FIG. 6, a flowchart illustrating a process for adjusting vehicle operation is shown in accordance with an illustrative embodiment. The process shown in FIG. 6 may be implemented in a computer, such as, for example, server 104 or data processing system 116 in FIG. 1; data processing system 200 in FIG. 2; or server 306 or data processing system 314 in FIG. 3.

The process begins when the data processing system receives an image from an imaging device located on a vehicle (step 602). The data processing system analyzes the image to identify an object (step 604). The data processing system performs a comparison of the object identified in the image with images of objects stored in a database (step 606).

The data processing system determines a potential safety issue associated with the object based on the comparison (step 608). In addition, the data processing system identifies a set of one or more protective roadway barriers in an area of the vehicle and the object (step 610). The data processing system calculates an adjustment to operation of the vehicle based on both the determined potential safety issue and the identified set of protective roadway barriers (step 612). The data processing system adjusts the operation of the vehicle based on the calculated adjustment (step 614). Thereafter, the process terminates.

Thus, illustrative embodiments of the present invention provide a computer-implemented method, computer system, and computer program product for detecting potential safety issues and dangers to vehicles. Potential safety issues may include, for example, unimpeded animals or humans approaching the path of the vehicle. Illustrative embodiments adjust control of the vehicle, such as reduce speed, change lanes if possible, and the like, and also adjust control of other vehicles within a defined proximity of the vehicle regarding an identified potential safety issue. In other words, a vehicle using an illustrative embodiment may detect a potential safety issue, such as a deer that could dart into the path of the vehicle, adjust its speed, and inform other vehicles in the surrounding area of the potential safety issue and, in some embodiments, adjust their speeds as well.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, using a safety awareness manager of a data processing system, an image from an imaging device located on a vehicle;
   analyzing, using an image analyzer of the safety awareness manager, the image to identify an object;
   comparing, using the image analyzer of the safety awareness manager, the object identified in the image with images of objects stored in a database to determine a potential safety issue associated with the object;
   determining, using the safety awareness manager, whether a set of protective roadway barriers is in an area of the vehicle and the object;
   calculating, using the safety awareness manager, an adjustment to an automated operational control of the vehicle based on the potential safety issue;
   when the set of protective roadway barriers is in the area of the vehicle and the object, determining, using the data processing system, whether the set of protective roadway barriers mitigates the potential safety issue;
   when the set of protective roadway barriers does not mitigate the potential safety issue, adjusting, using the safety awareness manager of the data processing system, the automated operational control of the vehicle based on the calculated adjustment; and
   utilizing, using the safety awareness manager, a feedback loop to teach a central server statistics regarding success or failure of the adjustment to the automated operational control of the vehicle in avoiding the potential safety issue.

2. The method of claim 1, wherein determining whether the set of protective roadway barriers is in the area of the vehicle and the object includes one or more of:
   performing an analysis of the image to determine that the set of protective roadway barriers is in the area; and
   performing a comparison of a geographic location of the vehicle based on global positioning system data with a map of the area around the vehicle to determine that the set of protective roadway barriers is in the area.

3. The method of claim 1 further comprising:
   determining whether one or more potential safety issues regarding one or more detected objects are communicated by one or more other vehicles in the area; and
   responsive to determining that the one or more potential safety issues regarding the one or more detected objects are communicated by the one or more other vehicles in the area, determining whether one or more protective roadway barriers exist proximate to the one or more detected objects.

4. The method of claim 1 further comprising:
   looking up rules associated with the potential safety issue; and
   performing a set of actions to adjust the automated operational control of the vehicle based on the rules associated with the potential safety issue.

5. The method of claim 4 further comprising:
   instructing other vehicles in the area to perform the set of actions.

6. The method of claim 1, wherein the imaging device is a camera.

7. The method of claim 1, wherein the object is one of an animal and a human.

8. The method of claim 1, wherein the set of protective roadway barriers includes at least one of a wall, a fence, a concrete barrier, and shrubbery.

9. The method of claim 1, wherein the database associates an object profile with each object image, and wherein the object profile defines behavior and characteristics of a particular object and associated rules.

10. A data processing system comprising:
    a bus system;
    a storage device connected to the bus system, wherein the storage device stores a first set of program instructions; and a processor connected to the bus system, wherein the processor executes the program instructions to:

receive, using a safety awareness manager of the data processing system, an image from an imaging device located on a vehicle;

analyze, using an image analyzer of the safety awareness manager, the image to identify an object;

compare, using the image analyzer of the safety awareness manager, the object identified in the image with images of objects stored in a database to determine a potential safety issue associated with the object;

determine, using the safety awareness manager, whether a set of protective roadway barriers is in an area of the vehicle and the object;

calculate, using the safety awareness manager, an adjustment to an automated operational control of the vehicle based on the potential safety issue;

when the set of protective roadway barriers is in the area of the vehicle and the object, determine, using the data processing system, whether the set of protective roadway barriers mitigates the potential safety issue;

when the set of protective roadway barriers does not mitigate the potential safety issue, adjust, using the safety awareness manager of the data processing system, the automated operational control of the vehicle based on the calculated adjustment; and utilize, using the safety awareness manager, a feedback loop to teach a central server statistics regarding success or failure of the adjustment to the automated operational control of the vehicle in avoiding the potential safety issue.

11. The data processing system of claim 10, wherein determining whether the set of protective roadway barriers is in the area of the vehicle and the object includes the processor executing a second set of program instructions to one or more of:

perform an analysis of the image to determine that the set of protective roadway barriers is in the area; and perform a comparison of a geographic location of the vehicle based on global positioning system data with a map of the area around the vehicle to determine that the set of protective roadway barriers is in the area.

12. The data processing system of claim 10, wherein the processor further executes the program instructions to:

determine whether one or more potential safety issues regarding one or more detected objects are communicated by one or more other vehicles in the area; and determine whether one or more protective roadway barriers exist proximate to the one or more detected objects in response to determining that the one or more potential safety issues regarding the one or more detected objects are communicated by the one or more other vehicles in the area.

13. The data processing system of claim 10, wherein the processor further executes the program instructions to:

look up rules associated with the potential safety issue; and perform a set of actions to adjust the automated operational control of the vehicle based on the rules associated with the potential safety issue.

14. The data processing system of claim 13, wherein the processor further executes the program instructions to:

instruct other vehicles in the area to perform the set of actions.

15. A computer program product comprising a non-transitory computer readable storage medium having program instructions embodied therewith, the program instructions executable by a computer to cause the computer to perform a method comprising:

receiving, using a safety awareness manager of a data processing system, an image from an imaging device located on a vehicle;

analyzing, using an image analyzer of the safety awareness manager, the image to identify an object;

comparing, using the image analyzer of the safety awareness manager, the object identified in the image with images of objects stored in a database to determine a potential safety issue associated with the object;

determining, using the safety awareness manager, whether a set of protective roadway barriers is in an area of the vehicle and the object;

calculating, using the safety awareness manager, an adjustment to an automated operational control of the vehicle based on the potential safety issue;

when the set of protective roadway barriers is in the area of the vehicle and the object, determining, using the data processing system, whether the set of protective roadway barriers mitigates the potential safety issue;

when the set of protective roadway barriers does not mitigate the potential safety issue, adjusting, using the safety awareness manager of the data processing system, the automated operational control of the vehicle based on the calculated adjustment; and utilizing, using the safety awareness manager, a feedback loop to teach a central server statistics regarding success or failure of the adjustment to the automated operational control of the vehicle in avoiding the potential safety issue.

16. The computer program product of claim 15, wherein determining whether the set of protective roadway barriers is in the area of the vehicle and the object includes one or more of:

performing an analysis of the image to determine that the set of protective roadway barriers is in the area; and performing a comparison of a geographic location of the vehicle based on global positioning system data with a map of the area around the vehicle to determine that the set of protective roadway barriers is in the area.

17. The computer program product of claim 15 further comprising:

determining whether one or more potential safety issues regarding one or more detected objects are communicated by one or more other vehicles in the area; and responsive to determining that the one or more potential safety issues regarding the one or more detected objects are communicated by the one or more other vehicles in the area, determining whether one or more protective roadway barriers exist proximate to the one or more detected objects.

18. The computer program product of claim 15 further comprising:

looking up rules associated with the potential safety issue; and performing a set of actions to adjust the automated operational control of the vehicle based on the rules associated with the potential safety issue.

19. The computer program product of claim 18 further comprising:

instructing other vehicles in the area to perform the set of actions.

20. The computer program product of claim 15, wherein the database associates an object profile with each object image, and wherein the object profile defines behavior and characteristics of a particular object and associated rules.

* * * * *